(12) United States Patent
Roos et al.

(10) Patent No.: US 8,542,667 B2
(45) Date of Patent: Sep. 24, 2013

(54) HIGH CAPACITY SATELLITE COMMUNICATIONS SYSTEM

(75) Inventors: David A. Roos, Boyds, MD (US); Adrian Morris, Darnestown, MD (US); Stanley Kay, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 210 days.

(21) Appl. No.: 13/086,505

(22) Filed: Apr. 14, 2011

(65) Prior Publication Data

US 2011/0255464 A1   Oct. 20, 2011

Related U.S. Application Data

(60) Provisional application No. 61/324,120, filed on Apr. 14, 2010.

(51) Int. Cl.
*H04L 12/28* (2006.01)
(52) U.S. Cl.
USPC .......................................................... 370/351

(58) Field of Classification Search
USPC .............. 370/351, 389, 395.1, 395.4, 395.41, 370/395.21; 455/403, 422.1, 450, 452.1
See application file for complete search history.

(56) References Cited

U.S. PATENT DOCUMENTS

| | | | | |
|---|---|---|---|---|
| 6,788,917 B1* | 9/2004 | Refai et al. | .................. | 455/12.1 |
| 6,940,833 B2* | 9/2005 | Jonas et al. | .................. | 370/329 |
| 7,382,743 B1* | 6/2008 | Rao et al. | ..................... | 370/316 |
| 7,852,855 B1* | 12/2010 | Gooding et al. | ......... | 370/395.42 |
| 2001/0043575 A1* | 11/2001 | Kelly | ........................... | 370/321 |
| 2005/0053033 A1* | 3/2005 | Kelly et al. | .................... | 370/329 |

\* cited by examiner

*Primary Examiner* — Fan Ng
(74) *Attorney, Agent, or Firm* — K&L Gates LLP

(57) ABSTRACT

A high capacity satellite communications system including a satellite with a beam for a forward downlink focused on a geographic area for which disproportionately higher capacity is desired, a hub located in a geographic area for which disproportionately lower capacity is desired, compared to the location of a VSAT, and the VSAT located in area where a beam for a forward downlink received by the VSAT from the satellite does not overlap with a beam for a return downlink received by the hub from a satellite.

33 Claims, 5 Drawing Sheets

HIGH CAPACITY SATELLITE COMMUNICATIONS SYSTEM

CROSS-REFERENCE TO RELATED APPLICATION

This application claims priority on the basis of provisional patent application No. 61/324,120, filed on Apr. 14, 2010. The entire disclosure of the provisional patent application is incorporated herein by this reference.

BACKGROUND

Conventional satellites may provide broad coverage over a range of populated areas. Because the capability of the satellite is spread over large geographic areas irrespective of the distribution of users who might take advantage of the satellite service, the equivalent isotropically radiated power (EIRP) and gain to system noise temperature (G/T) of the satellite in the direction of any individual user may be limited. Some satellites may "shape" their EIRP and G/T contours to attempt to put higher EIRP and/or G/T over areas such as those with higher rainfall intensity in an attempt to overcome higher rain attenuation. Such measures may not be able to match the variation in population, however.

The Hughes Spaceway 3 Ka band broadband spotbeam satellite may be able to distribute its capacity across its coverage area based on instantaneous demand; however, the technology that enables such flexibility may be very sophisticated and costly in terms of weight and power in the satellite. Spaceway 3 may thus be limited to about 10 Gbps of aggregate throughput. In addition, the demodulation/remodulation architecture may force the fundamental transmission parameters (modulation, coding, framing, access methods, etc.) to be frozen at design time, so the Spaceway 3 may not be able to take advantage of newer innovations in physical layer design.

BRIEF SUMMARY

It is an object of the present invention to provide a system and method for high capacity satellite communications.

In accordance with an aspect of the present invention, a high capacity satellite communications system includes a satellite with a beam for a forward downlink focused on a geographic area for which disproportionately higher capacity is desired, a hub located in a geographic area for which disproportionately lower capacity is desired, compared to the location of a VSAT, and the VSAT located in an area where a beam for a forward downlink received by the VSAT from the satellite does not overlap with a beam for a return downlink received by the hub from a satellite.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION

Figure 1:
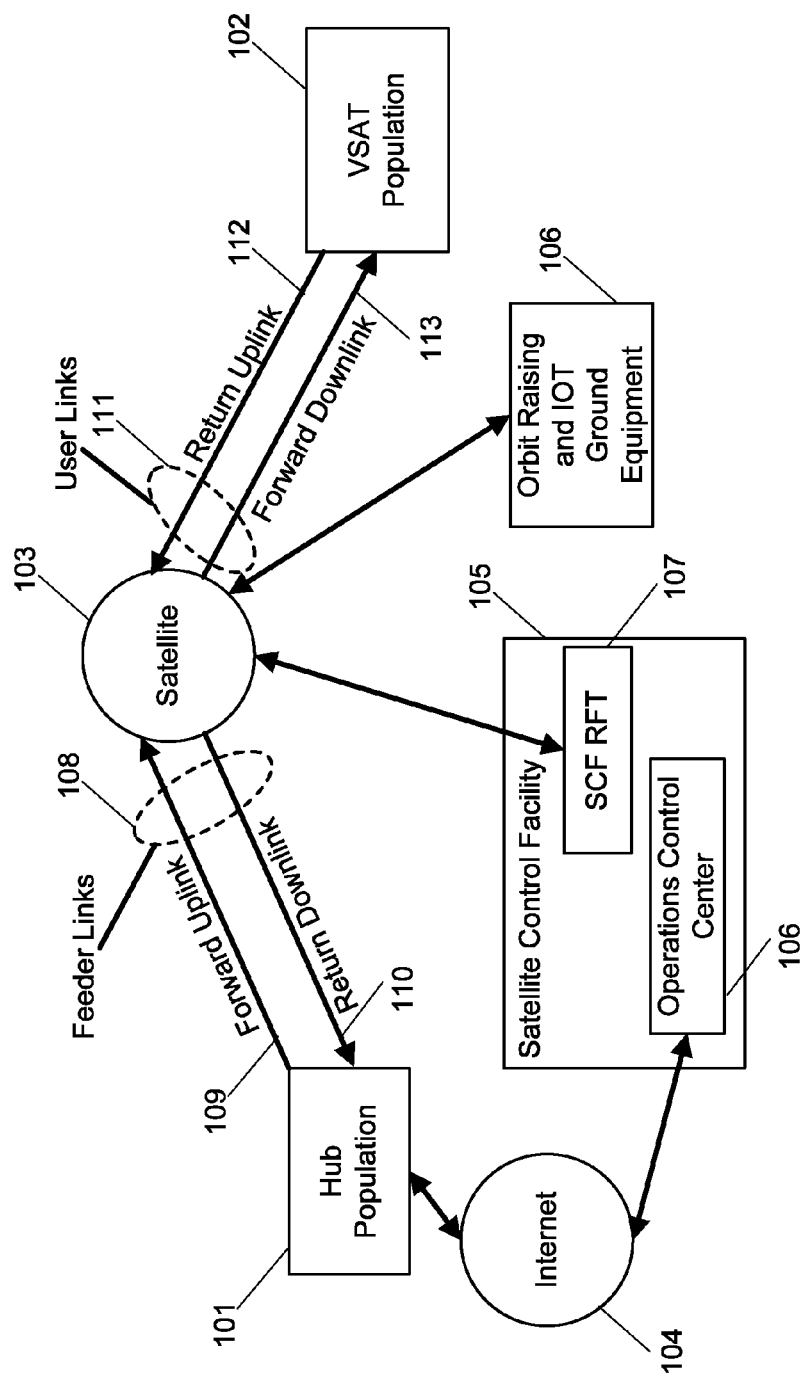
FIG. 1 depicts an exemplary high capacity satellite communications system.

FIG. 1 depicts an exemplary high capacity satellite communications system. The high capacity satellite communications system may include a hub population 101, a Very Small Aperture Terminal (VSAT) population 102, a satellite 103, the Internet 104, a satellite control facility 105, and orbit raising and IOT ground equipment 106.

The hub population 101 may include a number of hubs or gateways. The hubs in the hub population 101 may be connected to the VSATs in the VSAT population 102 through the satellite 103. Feeder links 108 may carry data between the hubs and the satellite 103, and may include a forward uplink 109 for transmitting data from a hub to the satellite 103, and the return downlink 110 for transmitting data from the satellite to a hub. User links 111 may carry data between the satellite 103 and the VSATs, and may include the return uplink 112 for transmitting data from a VSAT to the satellite 103, and a forward downlink 113 for transmitting data from the satellite 103 to a VSAT. The hubs may be high capacity, large antenna earth stations with connectivity to ground telecommunications infrastructure. Those skilled in the art will recognize that the present description does not preclude other configurations of hubs and VSATs; for example, "mesh" connected VSATS which do not need to communicate directly with a hub.

The VSAT population 102 may include a number of VSATs, which may be used by end users to access the satellite communications system. A VSAT may include a remote satellite dish for receiving RF signals from and transmitting RF signals to the satellite 103, a satellite modem and other equipment for managing the sending and receiving of data, and one or more remote hosts, which may be computer systems or other electronic devices capable of network communications at a site remote from the hubs in the hub population 101. For example, a VSAT may be used at a residence or place of business to provide access to the Internet 104.

The satellite 103 may be any suitable communications satellite for connecting the hub 101 to the remote hosts 116. For example, the satellite 103 may be a simple bent-pipe design geostationary satellite, which can accommodate innovations and variations in transmission parameters, operating in the Ka-band. The satellite 103 may use spot beams and frequency and polarization reuse to maximize the total capacity of the system. Signals passing through the satellite 103 in the forward direction, towards the VSATs, may be based on the DVB S.2 standard (ETSI EN 302 307) using signal constellations up to and including at least 16-APSK. The signals intended to pass through the satellite 103 in the return direction, toward the hubs, may be based on the IPoS standard (ETSI TS 102 354). Other suitable signal types may also be used in either direction, including, for example higher data rate variations of DVB S.2.

The satellite 103 may be capable of switching among hubs in the hub population 101. For example, in the event of a disaster at one of the hubs, the traffic associated with that hub may be switched to another redundant hub by any satellite 103 that was using the no longer operable hub. If, during the normal course of development one of the hub sites is not able to be developed, for example, due to construction delays, natural disaster, political problems, or economic changes, after the satellite 103 design has been committed, one of the redundant hubs sites may be used by the satellite 103 instead, thus reducing the risk that the full capacity of the satellite 103 won't be realized without one or more of the originally-intended hub sites.

Hubs in the hub population 101 may be connected to the Internet 104. Remote terminals connected to VSATs in the VSAT population 102 may connect to the Internet 104 through the satellite 103 and the hubs. Data sent from the VSAT to the Internet 104 may be transmitted to the satellite 103 on the return uplink 112, then from the satellite 103 to a hub in the hub population 101 using the return downlink 110. The hub may then transmit the data to the Internet 104. Data from the Internet 104 may be sent to a VSAT in the VSAT population 102 by being transmitted to a hub, then to the satellite 103 on the forward uplink 109, and then to the VSAT using the forward downlink 113.

For example, a computer connected to a VSAT may wish to access a specific web page on the Internet 104. The data requesting the web page may be sent from the VSAT to the satellite 103 on the return uplink 112. The satellite 103 may send the request to a hub in the hub population 101 on the return downlink 110. The hub may then access the data for the requested web page from the Internet 104, and send the web page data to the satellite 103 on the forward uplink 109. The satellite 103 may send the web page data to the requesting VSAT on the forward downlink 113, where the web page data may be passed to the requesting computer connected to the VSAT.

The satellite control facility 105 may be a ground station used to control the satellite 103, and may include operations control center 106 and satellite control facility radio frequency transceiver 107.

The satellite 103 may be responsible for providing access to the satellite communications system to more than one VSAT from the VSAT population 102, and there may be more than one satellite 103. The VSATs may be unevenly dispersed over any given geographic area, as more VSATs may be found in more populated areas and fewer VSATs in less populated areas. Further, if the forward downlink 113 and the return downlink 110 of the satellite 103 operate on the same frequency bands, the beams carrying the forward downlink 113 and the return downlink 110 may interfere with each other if the beams overlap, for example, if a VSAT is positioned too close to a hub. This may result in degradation of the bandwidth available to the VSATs.

Figure 2:
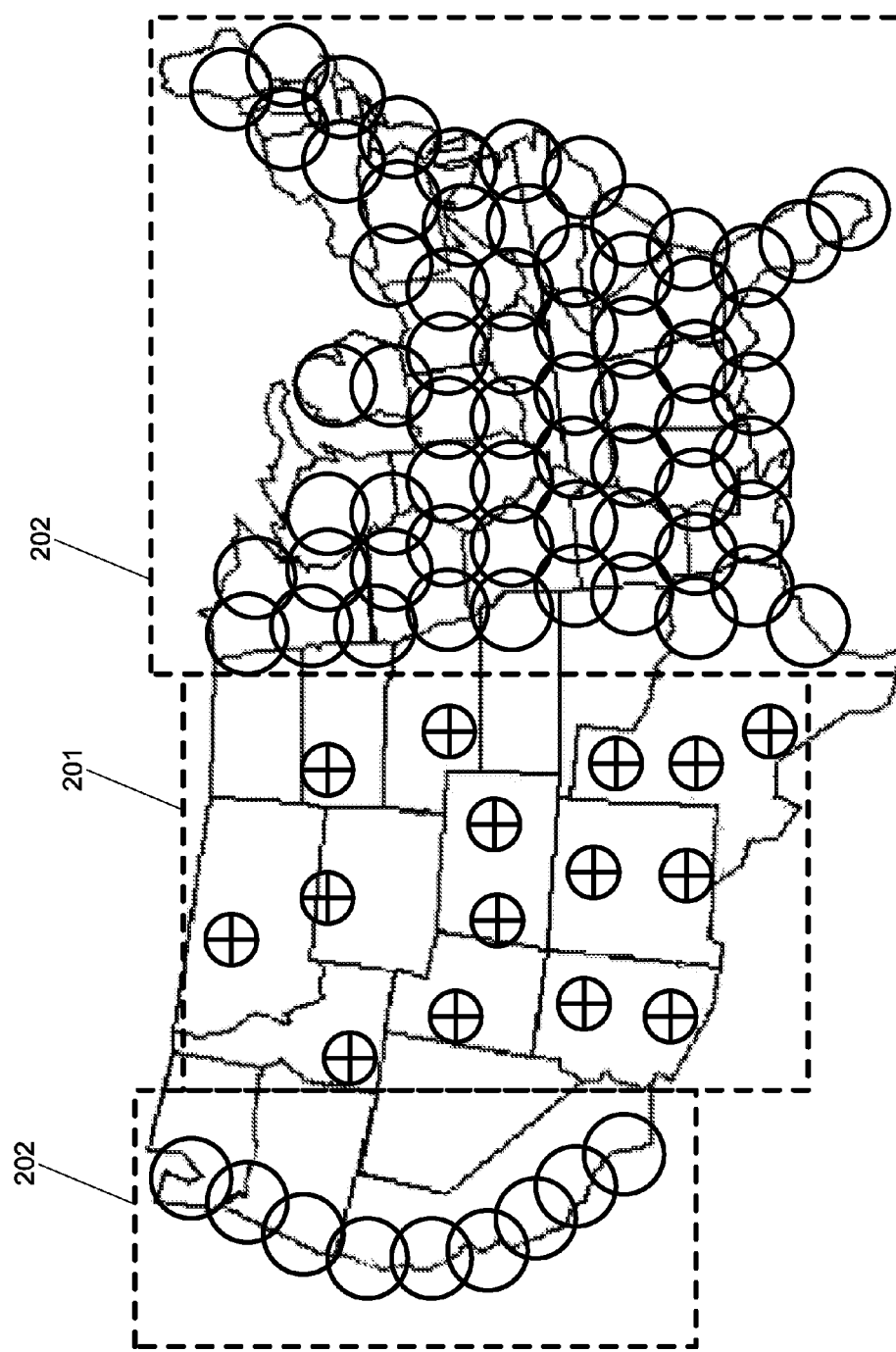
FIG. 2 depicts an exemplary satellite coverage and hub placement plan.

FIG. 2 depicts an exemplary satellite coverage and hub placement plan. An exemplary satellite coverage and hub placement plan for the continental United States may focus coverage from satellites 103 on areas where more capacity may be desired, for example more populated areas where more of the VSATs may be located, and may place the hubs from the hub population 201 in the less populated areas, where there may be fewer VSATs and less need for capacity. Other embodiments may use other criteria for allocating capacity disproportionately over the possible coverage area.

Hub area 201 may be an area with a lower population or lower population density, such that there may be fewer VSATs within the area, or otherwise less need for capacity. The hubs, represented by crossed-circles, from the hub population 101 may be placed in the hub area 201. VSAT areas 202 may be areas with higher populations or higher population density, such that there may be more VSATs within the area as compared to the hub area 201, or otherwise more need for capacity. The coverage area, represented by circles, of the beams from the satellites 103 carrying the forward downlinks 113, may be concentrated over the populated areas of the VSAT areas 202.

Because the hub population 101 may be placed within the hub area 201, away from the majority of the VSAT population 102 in the VSAT areas 202, the beams for the forward downlinks 113 may be separated from the beams for the return downlinks 110. This may minimize the chance for interference and allow the VSATs to utilize more of the bandwidth of the forward downlinks 113. Further, the coverage plan may result in the beams for the forward downlinks 113 being focused on the more populated areas, allowing more of the capacity of the satellite 103 to be used by VSAT users.

VSATs may still be located in the hub area 201. However, such VSATs may suffer from degraded bandwidth due to interference between the beams carrying the forward downlink 113 and the return downlink 110, as the VSATs may be too close to a hub.

In an alternative embodiment, in addition to, or instead of, separating the hub population 101 from the VSAT population 102, a distinct frequency spectrum for hubs, such as V-band (approximately 50 GHz), may be used. V-band may not usually be employed for satellite communication links because of the heavy impact of rain fade and the high cost of equipment. However, placing hubs in climatically dry regions may allow for the use of V-band, resulting in the forward downlinks 113 and the return downlinks 110 operating on different frequency bands, and therefore not interfering even if the beams overlap. This may allow for the hubs to be placed near VSATs without degrading the bandwidth available to the VSATs. Other combinations of or alternative frequency bands may be used in alternative embodiments.

Figure 3:
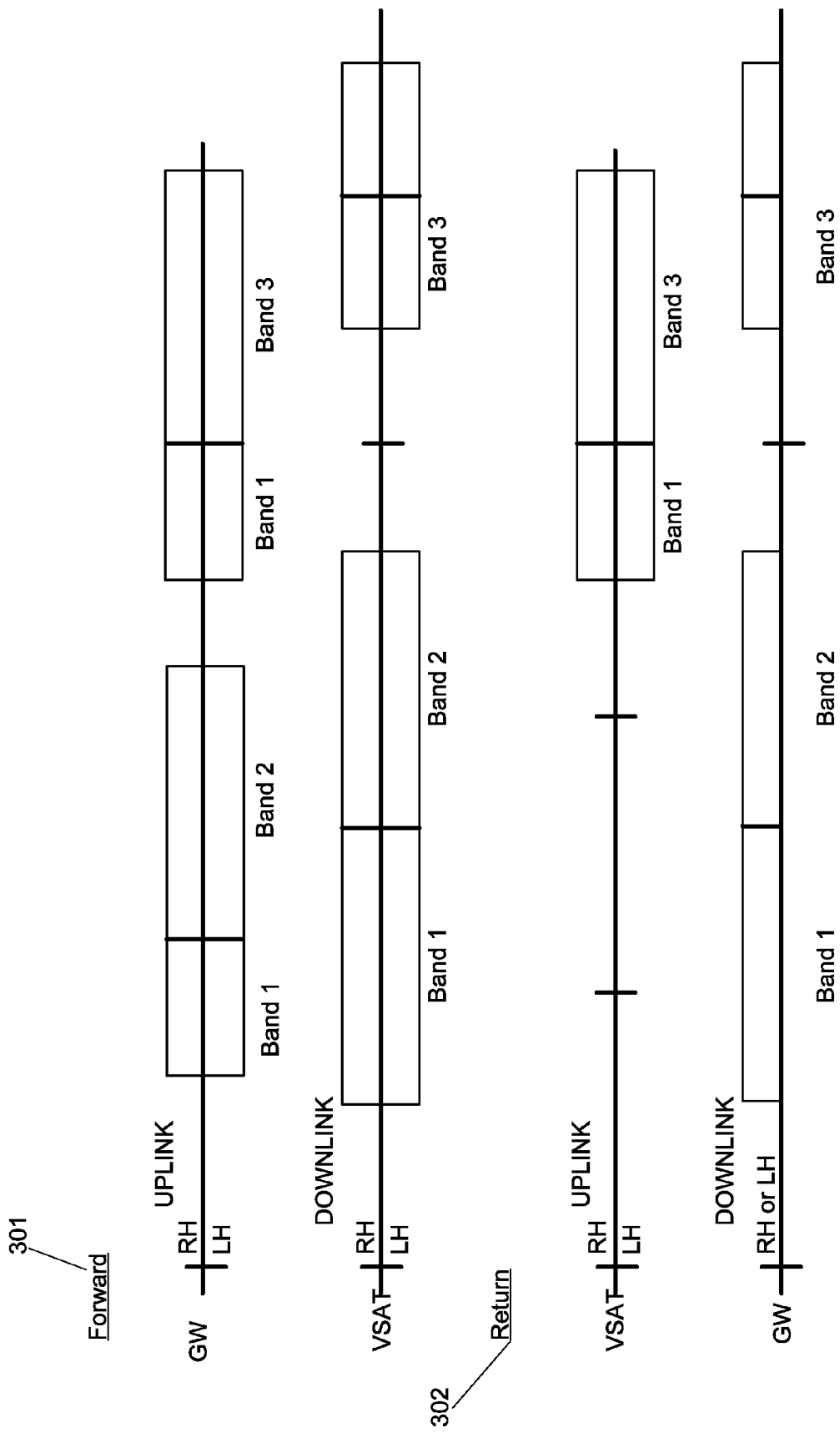
FIG. 3 depicts an exemplary frequency plan.

FIG. 3 depicts an exemplary frequency plan. If the hubs in the hub population 101 are spaced too closely, the beams carrying the return downlinks 110 from the satellites 103 to different hubs may overlap, causing interference. This may result in each hub having to be built at a distance from other hubs, which may not be optimal for construction and land usage purposes, and may constrain the growth of the satellite communications system by limiting the areas in which new hubs can be built. By reducing the bandwidth used by the return downlink 110, the beam footprint may be reduced in size, allowing hubs to be spaced closer together.

For example, in the forward direction 301, the bandwidth used on the forward uplink 109 between the hub, identified as GW, and the satellite 103, may use both left handed (LH) and right handed (RH) polarization. The forward downlink 113 from the satellite 103 to the VSAT may therefore also use both polarizations.

In the return direction 302, the bandwidth used on the return downlink 110 between the satellite 103 and the hub may use only either the left handed or right handed polarization. Half of the hubs in the hub population 101 may be assigned to only use the left handed polarization, and the other half may be assigned to only use the right handed polarization. Since each hub uses only half the available bandwidth, the beam footprint of each hub may be reduced. For example, the downlink frequency plan for the hubs may extend down to 18.3 GHz. By allocating only every other hub to a particular frequency and polarization, the hubs can be spaced based on the antenna beam patterns at 29.25 GHz, which may allow for much closer spacing than would be possible at 18.3 GHz. This may also result in the bandwidth available in the return direction 302 from the VSAT being cut in half, but this may not affect the end users of the VSATs, as traffic in the forward direction 301 may be many times greater than traffic in the return direction 302.

In conjunction with reducing the bandwidth used on the return downlink 110, the bandwidth used by the VSAT on the return uplink 112 may also be reduced. In the forward direction 301, the bandwidth available to the VSAT on the forward downlink 113 may be 1500 MHz, including 500 MHz on a first band, 500 MHz on a second band, and 500 MHz on a third band. If the hubs are set to use only half this bandwidth, or 750 MHz, on the return downlink 110, then the VSAT may be set to use only 750 MHz of bandwidth on the return uplink 112. This may result in reduced costs for manufacturing the VSATs, as they may only be manufactured to use a return uplink of 750 MHz, instead of 1500 MHz, resulting in reduced requirements for the expensive RF components of the VSAT. Because VSATs are manufactured in high volumes, a reduction in the cost of the VSATs may reduce the overall costs of the satellite communications system.

The satellite 103 may have a number of beams such as those illustrated in FIG. 2 which may use the same frequency and polarization. These beams may interfere with each other if they are too closely spaced on the earth's surface. In conventional satellite systems, the frequency and polarization of each beam may be distinct from the three beams closest to it. Such a plan is conventionally called a "4 cell reuse" plan because each of the four adjacent cells, where a cell may be the area on the earth's surface covered by a beam, may use a unique combination of frequency band and polarization. However, if a disproportionate amount of capacity is desired in one beam, it may be desirable to change the reuse pattern to, for example, a "3 cell reuse" pattern to allow more bandwidth to be allocated to one or more adjacent beams. Furthermore, if there are areas of coverage which are covered by a single row or column of beams, a "2 cell reuse" pattern may be employed to increase the bandwidth available to a beam even further. Further variations are possible, including variable bandwidth and reuse patterns depending on the disproportionate capacity allocation, and variable size beams.

The satellite 103 may include one traveling wave tube amplifier (TWTA) per beam. For example, there may be one TWTA for the forward downlink 113 and one TWTA for the return downlink 110. The satellite 103 may use any number of carriers on the bandwidth available to the forward downlink 113. However, using more carriers may result in greater amounts of intermodulation distortion when the TWTA is run at maximum power. The satellite 103 may need to reduce the power used by the TWTA for the forward downlink 113 as the number of carriers used on the forward downlink 113 increases to limit distortion, but this may result in a reduction of bandwidth available to the VSATs from the satellite 103. The total symbol rate for multiple carriers on the forward downlink 113 may be lower than the symbol rate achievable using fewer or only one carrier.

The TWTA of the satellite may be used more efficiently if the number of carriers on the forward downlink 113 is reduced as low as possible. If the frequencies available to the satellite 103 are continuous, the satellite 103 may operate a single, high speed carrier. Otherwise, if the frequencies are discontinuous, the satellite 103 may operate one carrier for each discontinuous frequency range available. The use of fewer carriers by the satellite 103 may allow the TWTA to operate at closer to maximum power, resulting in higher symbol rates and increased bandwidth available to the VSATs.

However, with fewer carriers, each VSAT in the VSAT population 102 may need to process more incoming data. For example, if the satellite 103 uses 20 carriers across 1500 MHz of bandwidth on the forward downlink 103, any VSAT in the VSAT population 102 may only need to receive, demodulate, and decode data from the 1 of the 20 carriers, on 75 MHz of bandwidth. If the VSAT population 102 is 200, then each VSAT may only need to process the data meant for 10 VSATs in order to receive its own data. If the number of carriers is reduced to 4, the VSATs may need to be able to receive and process data on 375 MHz of bandwidth, or the data meant for 50 VSATs. This may impose a greater burden on the decoding and demodulating hardware and software in the VSATs, which may result in the VSATs becoming more expensive to manufacture.

Figure 4:
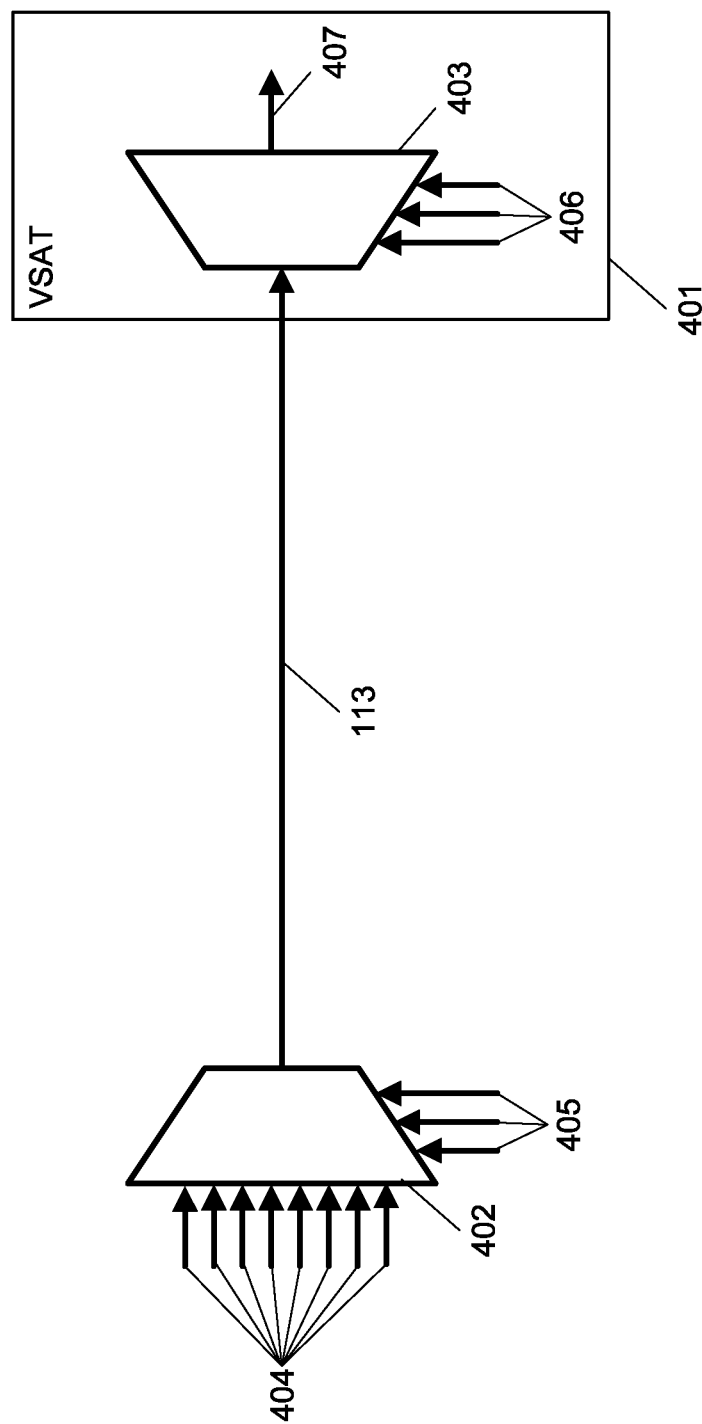
FIG. 4 depicts an exemplary multiplexer-demultiplexer.

FIG. 4 depicts an exemplary multiplexer-demultiplexer. In order to lessen the processing burden on individual VSATs, a simple multiplexing scheme may be used between the hub population 101 and the VSAT population 102, which may allow for fewer carriers to be used on the forward downlink 113 without requiring more expensive VSATs.

A multiplexer 402, including selection lines 405, may be located in the satellite 103 or in any other suitable location, including, for example a hub in the hub population 101. The multiplexer 402 may multiplex the data streams 404 meant for the VSATs using the satellite 103. The multiplexed data stream may be transmitted on the forward downlink 113 to the VSATs. The multiplexed data stream may be received by a VSAT 401, and may be processed by a demultiplexer 403. The selection lines 406 of the demultiplexer 403 may extract every nth bit from the multiplexed data stream, where n is a value assigned to the data stream 404 meant for the VSAT 401. For example, if the $5^{th}$ data stream 404 is the data stream meant for the VSAT 401, the demultiplexer 403 may extract every $5^{th}$ bit from the incoming multiplexed data stream.

The output of the demultiplexer 403 may be the demultiplexed data stream 405, which may be the data stream 404 that was meant for the VSAT 401, and may be sent to be demodulated and decoded by the appropriate hardware and software in the VSAT 401. Only the demultiplexer 403 may have to process the entire multiplexed data stream, allowing the demodulating and decoding hardware and software to process only the data actually meant for the VSAT 401. Because demultiplexing may be less computationally intensive than demodulating and decoding, the overall processing burden on the VSAT 401 may be reduced, allowing for less expensive VSATs.

On the return uplink 112, VSATs may use low-latency inroutes using, for example, SCMA (Scrambled Coded Multiple Access) technology, to reduce the latency of inbound transmissions. SCMA may use heavily error corrected data transmissions, allowing for multiple signals to overlap without waiting for specific timings. Other inroute that may be used include, for example, CPM (Code Phased Modulation).

Figure 5:
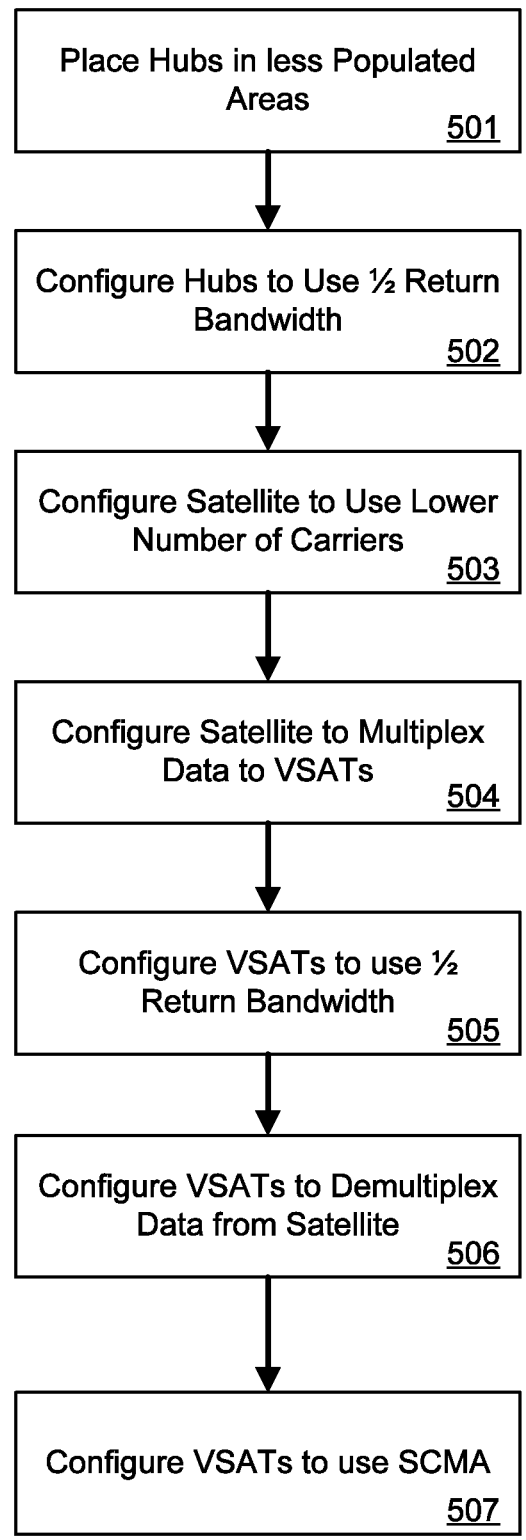
FIG. 5 depicts an exemplary procedure for providing a high capacity satellite communications system.

FIG. 5 depicts an exemplary procedure for providing a high capacity satellite communications system. In block 501, hubs may be placed in less populated areas of the geographic area to be covered by the satellite communications system. For example, the hub population 101 may be segregated from the VSAT population 102 in the hub area 201.

In block 502, the hubs may be configured to use half of the available return bandwidth. For example, half the hubs in the hub population 101 may be set to use signals with a right handed polarity for the return downlink 110, and the other half may be set use signals with a left handed polarity.

In block 503, the satellite 103 may be configured to use a lower number of carriers. For example, the satellite 103 may use as few carriers as possible for the forward downlink 113, based on the continuity of the frequencies available to the satellite 103.

In block 504, the satellite 103 may be configured to multiplex data carried on the forward downlink 113. The satellite 103 may use a multiplex the data from the forward uplink 109 meant for the VSAT population 102, and transmit one multiplexed data stream on the forward downlink 113.

In block 505, the VSATs in the VSAT population 102 may be configured to use half of the available return bandwidth. For example, the VSATs may be set to use only 750 MHz of an available 1500 MHz of bandwidth on the return uplink 112.

In block 506, the VSATs in the VSAT population 102 may be configured to demultiplex the multiplexed data received from the satellite 103. The VSATs may be built with a demultiplexer, which may be set to extract every nth bit from the multiplexed data received on the forward downlink 113, where n is unique to each VSAT on the same carrier.

In block 507, the VSATs in the VSAT population 102 may be configured to use SCMA, or any other suitable low-latency, high efficiency, technology on the return uplink 112.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A high capacity satellite communications system comprising:
    at least one satellite with at least one beam for a forward downlink focused on a first geographic coverage area;
    at least one hub located in a second geographic coverage area which is different from the first geographic coverage area, the first geographic coverage area and the second geographic coverage area configured with disproportionate amounts of bandwidth capacity such that the first geographic coverage area provides more bandwidth capacity and the second geographic coverage area provides less bandwidth capacity;
    at least one VSAT located in the first geographic coverage area where a first beam for the forward downlink received by the VSAT from a satellite does not overlap with a second beam for a return downlink received by a hub from the satellite,
    wherein the at least one VSAT is configured to use a return bandwidth that is at most half of the available return bandwidth.

2. The system of claim 1, wherein the at least one hub is configured to use a return bandwidth that is at most half of a forward bandwidth.

3. The system of claim 1, wherein the at least one satellite is configured to switch to one or more redundant hubs if that at least one hub is unavailable.

4. The system of claim 1, wherein the at least one satellite is configured to use as few carriers as possible for the forward downlink based on the continuity of the frequencies available to the at least one satellite and a maximum bandwidth capacity of the at least one VSAT.

5. The system of claim 1, wherein the at least one VSAT uses one of SCMA and CPM on a return uplink to the at least one satellite.

6. The system of claim 1, wherein the return bandwidth is contiguous.

7. The system of claim 1, wherein the at least one satellite comprises at least one multiplexer; and wherein the at least one multiplexer is configured to multiplex data received from the at least one hub.

8. The system of claim 1, wherein the at least one hub comprises at least one multiplexer; and wherein the at least one multiplexer is configured to multiplex data originating from the at least one hub.

9. The system of claim 1, wherein the at least one VSAT comprises at least one demultiplexer; wherein the at least one demultiplexer is configured to demultiplex data received from the at least one satellite.

10. The system of claim 1, wherein the frequency reuse plan varies depending on the proportionality of the traffic provided.

11. The system of claim 1, wherein each of the at least one beams receives ⅓ of the available spectrum.

12. A high capacity satellite communications system comprising:
a VSAT population comprising VSATs;
a hub population comprising hubs, wherein the hub population is geographically segregated from the VSAT population; and
at least one satellite comprising at least one multiplexer configured to multiplex data received from a hub in the hub population,
wherein half the hubs in the hub population are configured to receive a beam for a return downlink using a left handed polarity and an other half of the hubs in the hub population are configured to receive a beam for a return downlink using a right handed polarity.

13. The system of claim 12, wherein hubs in the hub population are configured to receive a beam for a return downlink on a different frequency band from a frequency band used for a beam for a forward downlink.

14. The system of claim 12, wherein the hub population is partitioned into two or more approximately equal-sized groups of hubs, each group of hubs being configured to receive a beam for a return downlink using a fraction of the total return bandwidth available.

15. The system of claim 12, wherein the VSATs in the VSAT population are concentrated in a first geographic coverage area and at least one hub is located in a second geographic coverage area which is different from the first geographic coverage area, the first geographic coverage area and the second geographic coverage area configured with disproportionate amounts of bandwidth capacity such that the first geographic coverage area provides more bandwidth capacity and the second geographic coverage area provides less bandwidth capacity.

16. A method for a high capacity satellite communications system comprising:
constructing at least one hub, wherein at least one VSAT is located in a first geographic coverage area, and the at least one hub is located in a second geographic coverage area which is different from the first geographic coverage area, the first geographic coverage area and the second geographic coverage area configured with disproportionate amounts of bandwidth capacity such that the first geographic coverage area provides more bandwidth capacity and the second geographic coverage area provides less bandwidth capacity;
configuring the at least one hub to use a return bandwidth that is no more than half a forward bandwidth;
configuring at least one satellite to use as few carriers as possible based on the continuity of the frequencies available to the at least one satellite; and
configuring the at least one VSAT to use a return bandwidth of no more than half the available return bandwidth to the at least one satellite.

17. The method of claim 16, further comprising:
configuring the at least one satellite to multiplex data for at least one VSAT received from the at least one hub;
configuring the at least one VSAT to demultiplex data received from the at least one satellite.

18. The method of claim 16, further comprising:
configuring the at least one hub to multiplex data for at least one VSAT originating from the at least one hub;
configuring the at least one VSAT to demultiplex data received from the at least one satellite.

19. The method of claim 16 further comprising:
configuring the at least one VSAT to use SCMA when sending data to the at least one satellite.

20. A high capacity satellite communications system comprising:
a VSAT population comprising VSATs;
a hub population comprising hubs, wherein the hub population is geographically segregated from the VSAT population; and
at least one hub comprising at least one multiplexer configured to multiplex data originating from the at least one hub in the hub population,
wherein half the hubs in the hub population are configured to receive a beam for a return downlink using a left handed polarity and an other half of the hubs in the hub population are configured to receive a beam for a return downlink using a right handed polarity.

21. The system of claim 20, wherein hubs in the hub population are configured to receive a beam for a return downlink on a different frequency band from a frequency band used for a beam for a forward downlink.

22. The system of claim 20, wherein the hub population is partitioned into two or more approximately equal-sized groups of hubs, each group of hubs being configured to receive a beam for a return downlink using a fraction of the total return bandwidth available.

23. The system of claim 20, wherein the VSATs in the VSAT population are concentrated in a first geographic coverage area and at least one hub is located in a second geographic coverage area which is different from the first geographic coverage area, the first geographic coverage area and the second geographic coverage area configured with disproportionate amounts of bandwidth capacity such that the first geographic coverage area provides more bandwidth capacity and the second geographic coverage area provides less bandwidth capacity.

24. A high capacity satellite communications system comprising:
at least one satellite with at least one beam for a forward downlink focused on a first geographic coverage area;
at least one hub located in a second geographic coverage area which is different from the first geographic coverage area, the first geographic coverage area and the second geographic coverage area configured with disproportionate amounts of bandwidth capacity such that the first geographic coverage area provides more bandwidth capacity and the second geographic coverage area provides less bandwidth capacity; and
at least one VSAT located in the first geographic coverage area where a first beam for the forward downlink received by the VSAT from a satellite does not overlap with a second beam for a return downlink received by a hub from the satellite,
wherein each of the at least one beams receives ⅓ of the available spectrum.

25. The system of claim 24, wherein the at least one hub is configured to use a return bandwidth that is at most half of a forward bandwidth.

26. The system of claim 24, wherein the at least one satellite is configured to switch to one or more redundant hubs if that at least one hub is unavailable.

27. The system of claim 24, wherein the at least one satellite is configured to use as few carriers as possible for the forward downlink based on the continuity of the frequencies available to the at least one satellite and a maximum bandwidth capacity of the at least one VSAT.

28. The system of claim 24, wherein the at least one VSAT uses one of SCMA and CPM on a return uplink to the at least one satellite.

29. The system of claim 24, wherein the at least one VSAT is configured to use a return bandwidth that is at most half of the available return bandwidth and the return bandwidth is contiguous.

30. The system of claim 24, wherein the at least one satellite comprises at least one multiplexer; and wherein the at least one multiplexer is configured to multiplex data received from the at least one hub.

31. The system of claim 24, wherein the at least one hub comprises at least one multiplexer; and wherein the at least one multiplexer is configured to multiplex data originating from the at least one hub.

32. The system of claim 24, wherein the at least one VSAT comprises at least one demultiplexer; wherein the at least one demultiplexer is configured to demultiplex data received from the at least one satellite.

33. The system of claim 24, wherein the frequency reuse plan varies depending on the proportionality of the traffic provided.

* * * * *